United States Patent
Kim et al.

(10) Patent No.: US 12,145,463 B2
(45) Date of Patent: Nov. 19, 2024

(54) VEHICLE THAT RECEIVES POWER WIRELESSLY WHILE THE VEHICLE IS MOVING, SERVER FOR THE SAME, AND WIRELESS CHARGING SYSTEM

(71) Applicants: Hyundai Motor Company, Seoul (KR); Kia Corporation, Seoul (KR); Research & Business Foundation Sungkyunkwan University, Gyeonggi-do (KR)

(72) Inventors: Ji Hwon Kim, Gyeonggi-do (KR); So Jin Lee, Gyeonggi-Do (KR); Tae-Jin Lee, Gyeonggi-do (KR); Yunmin Kim, Gyeonggi-Do (KR); Kyoung Min Kim, Seoul (KR); Kwanyoung Moon, Daegu (KR)

(73) Assignees: Hyundai Motor Company, Seoul (KR); Kia Corporation, Seoul (KR); Research & Business Foundation Sungkyunkwan University, Suwon (KR)

( * ) Notice: Subject to any disclaimer, the term of this patent is extended or adjusted under 35 U.S.C. 154(b) by 487 days.

(21) Appl. No.: 17/506,325

(22) Filed: Oct. 20, 2021

(65) Prior Publication Data
US 2022/0340035 A1    Oct. 27, 2022

(30) Foreign Application Priority Data
Apr. 21, 2021  (KR) .......................... 10-2021-0051539

(51) Int. Cl.
*B60L 53/66*  (2019.01)
*B60L 53/12*  (2019.01)
(Continued)

(52) U.S. Cl.
CPC ............... *B60L 53/66* (2019.02); *B60L 53/12* (2019.02); *B60L 53/126* (2019.02);
(Continued)

(58) Field of Classification Search
CPC ........ B60L 53/66; B60L 53/12; B60L 53/126; B60L 53/305; B60L 53/32; B60L 53/38;
(Continued)

(56) References Cited

U.S. PATENT DOCUMENTS 6,421,600 B1 *  7/2002  Ross ....................... B60L 5/005
                                                           180/2.1
10,131,238 B2    11/2018  Ricci
(Continued)

FOREIGN PATENT DOCUMENTS

JP        6270964 B2    1/2018

*Primary Examiner* — Richard Isla
*Assistant Examiner* — Manuel Hernandez
(74) *Attorney, Agent, or Firm* — Fox Rothschild LLP (57) ABSTRACT

A communication device of a vehicle transmits a charging permission request message to a server and receives charging permission information from the server. A charging requester is configured to transmit a charging request message including the charging permission information to a charging device and a power receiver is configured to receive a charging response message from the charging device and to wirelessly receive power from the charging device.

8 Claims, 6 Drawing Sheets

(51) Int. Cl.
   *B60L 53/126* (2019.01)
   *B60L 53/30* (2019.01)
   *B60L 53/38* (2019.01)
   *B60L 53/60* (2019.01)
   *B60L 53/65* (2019.01)
   *B60W 30/165* (2020.01)
   *G08G 1/00* (2006.01)
   *H04L 67/12* (2022.01)

(52) U.S. Cl.
   CPC ............. *B60L 53/305* (2019.02); *B60L 53/32* (2019.02); *B60L 53/38* (2019.02); *B60L 53/60* (2019.02); *B60L 53/65* (2019.02); *B60L 53/665* (2019.02); *B60W 30/165* (2013.01); *G08G 1/22* (2013.01); *H04L 67/12* (2013.01)

(58) Field of Classification Search
   CPC ........ B60L 53/60; B60L 53/65; B60L 53/665; B60W 30/165; H04L 67/12
   USPC ......................................................... 320/109
   See application file for complete search history.

(56) References Cited

U.S. PATENT DOCUMENTS

| | | | |
|---|---|---|---|
| 11,648,847 B1* | 5/2023 | Ng | B60L 58/12 320/109 |
| 2012/0233077 A1 | 9/2012 | Tate, Jr. et al. | |
| 2018/0222340 A1 | 8/2018 | Zhao et al. | |
| 2019/0202304 A1* | 7/2019 | Moghe | B60L 53/38 |
| 2021/0323420 A1* | 10/2021 | Lu | H04L 63/123 |
| 2022/0012647 A1* | 1/2022 | Lee | B60L 53/305 |
| 2022/0281343 A1* | 9/2022 | Yang | B60L 53/305 |
| 2024/0062245 A1* | 2/2024 | Rohrbaugh | G07F 15/006 |

* cited by examiner

VEHICLE THAT RECEIVES POWER WIRELESSLY WHILE THE VEHICLE IS MOVING, SERVER FOR THE SAME, AND WIRELESS CHARGING SYSTEM

CROSS-REFERENCE TO RELATED APPLICATION

This application claims priority to and benefits of Korean Patent Application No. 10-2021-0051539, filed on Apr. 21, 2021, the entire contents of which are incorporated herein by reference.

BACKGROUND

(a) Field of the Disclosure

Exemplary embodiments disclosed in the present document relate to a vehicle, a server, and a wireless charging system.

(b) Description of the Related Art

An electric vehicle is a vehicle that is driven by rotating a motor with electricity accumulated in a battery of the vehicle. Accordingly, electric vehicles need to be recharged at an electric charging station to charge the battery when the battery state of charge is less than a particular value.

Although the supply of electric vehicles is increasing every year, the supply of electric vehicle charging stations has not kept pace, and thus a problem of expanding the supply of electric vehicle charging stations is being raised. However, a time required to charge the battery of an electric vehicle takes more time than that of gasoline and diesel vehicles, and a long standby time is required for battery charging, so there is a need to respond to changes in road conditions and vehicle driving methods in the charging method of electric vehicles. In addition, a flexible communication method that considers mobility of the vehicle is required for the charging method of the electric vehicle.

The above information disclosed in this section is merely for enhancement of understanding of the background of the disclosure, and therefore, it may contain information that does not form the prior art that is already known in this country to a person of ordinary skill in the art.

SUMMARY

Exemplary embodiments disclosed in the present document has been made in an effort to provide a vehicle, a server and a wireless charging system, capable of improving traffic flow and road stability by enabling battery charging while driving an electric vehicle without stopping the vehicle for charging an electric vehicle battery. Exemplary embodiments disclosed in the present document has been made in an effort to provide a vehicle, a server and a wireless charging system, capable of providing a flexible communication method that respond to changes in road conditions and a driving method of a vehicle and considers mobility of the vehicle.

The technical objects of the exemplary embodiments disclosed in the present document are not limited to the objects mentioned above, and other technical objects not mentioned can be clearly understood by those skilled in the art from the description of the claims.

An exemplary embodiment disclosed in the present document provides a vehicle including: a communication device configured to transmit a charging permission request message to a server and to receive charging permission information from the server; a charging requester configured to transmit a charging request message including the charging permission information to a charging device; and a power receiver configured to receive a charging response message from the charging device and to wirelessly receive power from the charging device.

In an exemplary embodiment, the power receiver may wirelessly receive power from the charging device while the vehicle is moving. In an exemplary embodiment, the charging device may be installed on a road surface to wirelessly transmit power to a vehicle. In an exemplary embodiment, the vehicle may be a leader vehicle forming a platooning vehicle group with at least one following vehicle.

In an exemplary embodiment, the leader vehicle may join a non-platooning vehicle not belonging to a platooning vehicle group to the platooning vehicle group when there is at least one vehicle having a same charging method as that of the non-platooning vehicle among vehicles belonging to the platooning vehicle group in the case of receiving information related to a vehicle identification (ID) and the charging method from the non-platooning vehicle.

In addition, the charging permission information may include information related to a charging device that may be used by the vehicle and a certificate for using the charging device. The charging request message may include vehicle information including a vehicle ID, a driving speed, and a vehicle position, and wireless charging permission information including a certificate for using the charging device.

An exemplary embodiment disclosed in the present document provides a server that may include: a communication device configured to collect and manage charging device information, to receive a charging permission request message from a vehicle, and to transmit charging permission information to the vehicle; and a billing processor configured to receive metering information that is generated by using a power supply amount or cost information per unit power for the vehicle from the charging device and to charge the vehicle based on the metering information when the vehicle deviates from the charging device.

In an exemplary embodiment, the charging device may be installed on a road surface to wirelessly transmit power to a vehicle. The vehicle may be a leader vehicle forming a platooning vehicle group with at least one following vehicle. The charging permission information may include information related to a charging device that may be used by the vehicle and a certificate for using the charging device.

An exemplary embodiment disclosed in the present document provides a wireless charging system that may include: a charging device installed on a road surface to wirelessly transmit power to a vehicle, and to generate metering information by using a power supply amount or cost information per unit power for the vehicle when the vehicle deviates from a charging area or a charging path; and a server configured to collect and manage information related to the charging device, to receive a charging permission request message from the vehicle, to transmit charging permission information to the vehicle, to receive the metering information from the charging device, and to charge the vehicle based on the metering information.

In an exemplary embodiment, the vehicle may be a leader vehicle forming a platooning vehicle group with at least one following vehicle. The charging device may be configured to receive a charging request message including vehicle information including a vehicle ID, a driving speed, and a vehicle position, and charging permission information including a certificate for using the charging device from the vehicle, to check the charging permission information, and to transmit a charging response message to the vehicle to wirelessly transmit power to the vehicle.

In accordance with a vehicle, a server and a wireless charging system according to an exemplary embodiment disclosed in the present document, it may be possible to improve traffic flow and road stability by enabling battery charging while driving an electric vehicle without stopping the vehicle for charging an electric vehicle battery. In accordance with a vehicle, a server and a wireless charging system according to an exemplary embodiment disclosed in the present document, it may be possible to provide a flexible communication method that respond to changes in road conditions and a driving method of a vehicle and considers mobility of the vehicle.

DETAILED DESCRIPTION

Hereinafter, some exemplary embodiments disclosed in the present document will be described in detail with reference to exemplary drawings. It should be noted that in adding reference numerals to constituent elements of each drawing, the same constituent elements have the same reference numerals as possible even though they are indicated on different drawings. In describing exemplary embodiments disclosed in the present document, when it is determined that a detailed description of the well-known configuration or function associated with the present disclosure may obscure the gist of the present disclosure, it will be omitted.

In describing constituent elements according to an exemplary embodiment disclosed in the present document, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which exemplary embodiments disclosed in the present document pertains (those skilled in the art) unless they are differently defined. Terms defined in a generally used dictionary shall be construed to have meanings matching those in the context of a related art, and shall not be construed to have idealized or excessively formal meanings unless they are clearly defined in the present document.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 1:
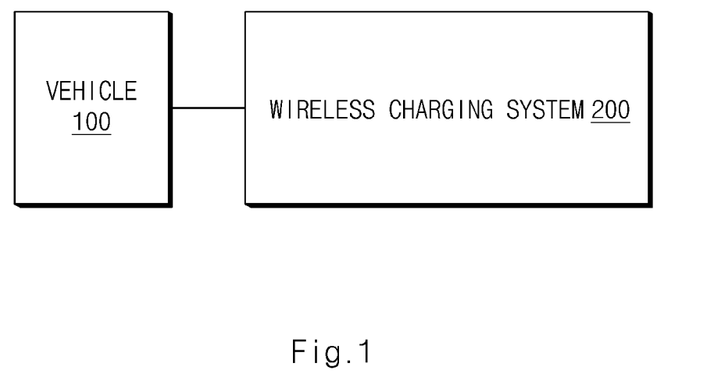
FIG. 1 illustrates a block diagram showing a relationship between a vehicle and a wireless charging system according to an exemplary embodiment disclosed in the present document.

FIG. 1 illustrates a block diagram showing a relationship between a vehicle and a wireless charging system according to an exemplary embodiment disclosed in the present document. Referring to FIG. 1, the vehicle 100 may be configured to communicate with the wireless charging system 200 to wirelessly charge a vehicle battery. Herein, the wireless charging system 200 may include a charging device 210 and a server 220.

Figure 2:
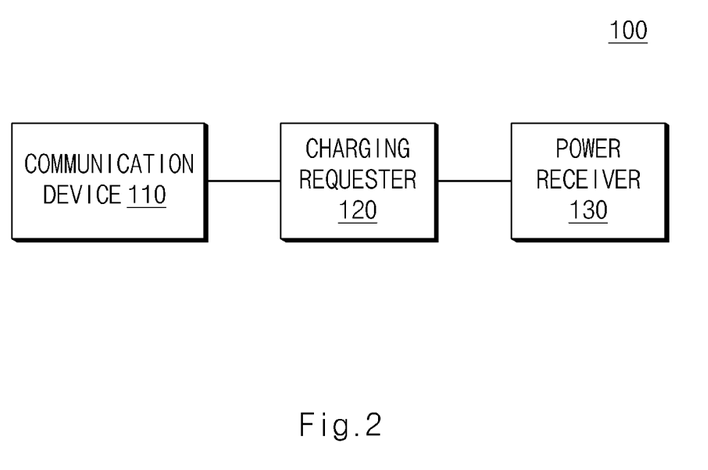
FIG. 2 illustrates a block diagram showing a vehicle according to an exemplary embodiment disclosed in the present document.

Hereinafter, each of the vehicle 100 and the wireless charging system 200 will be described in detail. First, an operation of the vehicle 100 will be described with reference to FIG. 2. FIG. 2 illustrates a block diagram showing a vehicle according to an exemplary embodiment disclosed in the present document. Referring to FIG. 2, the vehicle 100 may include a communication device 110 configured to receive charging permission information from the server 220, a charging requester 120 configured to transmit a charging request message to the charging device 210, and a power receiver 130 configured to wirelessly receive power from the charging device 210.

The vehicle 100 may include an electric vehicle driven by rotating a motor with electricity accumulated in a battery of the vehicle. For example, the vehicle 100 may include a leader vehicle forming a platooning vehicle group with one or more following vehicles. Herein, platooning may be defined as a driving form in which several autonomous vehicles move in groups. The platooning may be defined as a structure in which a leader vehicle in charge of driving, and other vehicles are joined through a platform around the leader vehicle. Vehicles belonging to the platooning vehicle group may drive while maintaining an inter-vehicle distance through an inter-vehicle distance control technique, and each of the vehicles may rapidly exchange traffic-related information such as direction, traffic light, position, and speed through network connection.

The communication device 110 may be configured to transmit a charging permission request message to the server 220. Herein, the charging permission request message may include a vehicle movement path and charging method information. In addition, the communication device 110 may be configured to receive charging permission information in response to the charging permission request message from the server 220. The charging permission information may include information related to the charging device 210 that may be used by the vehicle 100 in the moving path of the vehicle 100 and a certificate for using the charging device 210.

The charging requester 120 may be configured to transmit a charging request message including the charging permission information to the charging device 210. Herein, the charging device 210 may be installed on a road surface to wirelessly transmit power to the vehicle 100. The charging request message may include vehicle information including a vehicle ID, a driving speed, and a vehicle position, and wireless charging permission information including a certificate for using the charging device 210. For example, the charging request message transmitted by the leader vehicle of the platooning vehicle group may include IDs of vehicles performing platooning, information related to the vehicles performing platooning, including an inter-vehicle distance, a driving speed, and a vehicle position of the vehicles performing platooning, and a certificate for using the charging device 210. The power receiver 130 may be configured to receive a charging response message from the charging device 210 to wirelessly receive power from the charging device 210.

Figure 3:
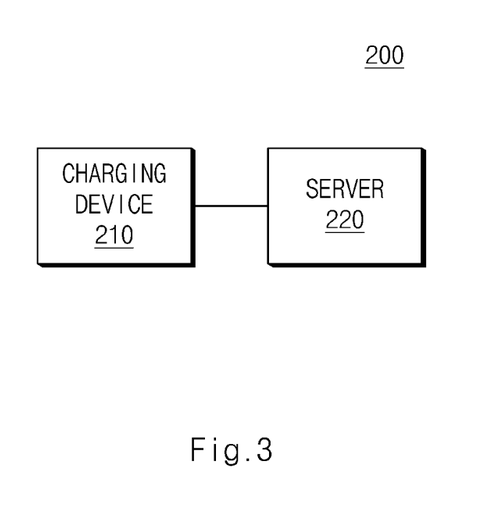
FIG. 3 illustrates a block diagram showing a wireless charging system according to an exemplary embodiment disclosed in the present document.

Hereinafter, an operation of the wireless charging system will be described in detail with reference to FIG. 3. FIG. 3 illustrates a block diagram showing a wireless charging system 200 according to an exemplary embodiment disclosed in the present document. Referring to FIG. 3, the wireless charging system 200 may include a charging device 210 and a server 220. Hereinafter, according to an exemplary embodiment, the vehicle 100 may be the leader vehicle 100 forming a platooning vehicle group with one or more following vehicles 100.

The charging device 210 may be a device for charging power of the vehicle 100. For example, the charging device 210 may be installed on a road surface to wirelessly transmit power to the vehicle 100. The charging device 210 may be disposed in a charging zone. In particular, the charging zone may be defined as an area for the vehicle 100 to enter and receive power from the charging device 210. The charging zone may be defined as an area for the vehicle 100 to enter and receive power from the charging device 210. For example, the charging zone may be set in a road surface or in a region other than a road.

The charging device 210 may be configured to periodically transmit charging device information to the server 220. The charging device 210 may be configured to receive a charging request message including information including a vehicle ID, a driving speed, and a position of the vehicle 100 and charging permission information including a certificate for using the charging device 210. The charging device 210 may be configured to check the charging permission information received from the vehicle 100, and transmit a charging response message to the vehicle 100 to wirelessly transmit power to the vehicle 100.

When the vehicle 100 deviates from a charging area or a charging path, the charging device 210 may be configured to generate metering information by using a power supply amount or cost information per unit power for the vehicle 100. For example, in the case of the vehicles performing platooning, the charging device 210 may be configured to generate the metering information by using a power supply amount for each individual vehicle and cost information per unit power.

The server 220 may be configured to collect and manage charging device information received from the charging device 210. In addition, the server 220 may be configured to transmit charging permission information to the vehicle 100 in response to the charging permission request message received from the vehicle 100. Herein, the charging permission request message may include a vehicle movement path and charging method information. The charging permission information may include information related to the charging device 210 that may be used by the vehicle 100 in the moving path of the vehicle 100 and a certificate for using the charging device 210.

The server 220 may be configured to receive the metering information from the charging device 210, and may be configured to charge the vehicle 100 based on the metering information. For example, when receiving the metering information generated by using the power supply amount or the cost information per unit power for each individual vehicle of the vehicles performing the platooning from the charging device 210, the server 220 may be configured to charge for each individual vehicle.

Figure 4:
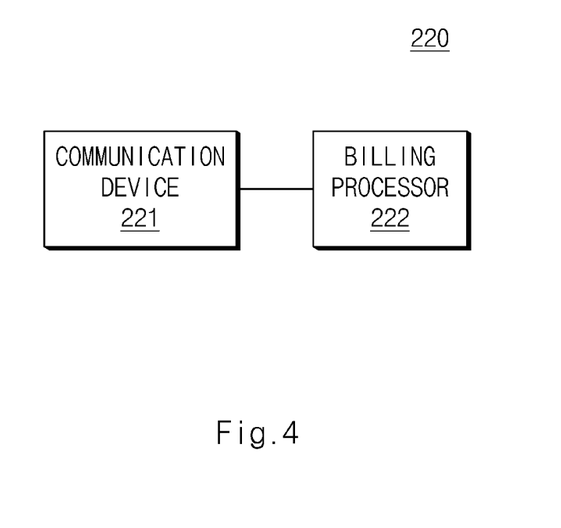
FIG. 4 illustrates a block diagram showing a server according to an exemplary embodiment disclosed in the present document.

Hereinafter, the server 220 of the wireless charging system 200 will be described in detail. FIG. 4 illustrates a block diagram showing a server according to an exemplary embodiment disclosed in the present document. Referring to FIG. 4, the server 220 may include a communication device 221 and a billing processor 222.

The communication device 221 may be configured to collect and manage information of the charging device 210. The communication device 221 may be configured to periodically receive charging device information related to a road from the charging device 210. Herein, the charging device 210 may be installed on a road surface to wirelessly transmit power to the vehicle 100. The communication device 221 may be configured to receive a charging permission request message from the vehicle 100, and transmit charging permission information to the vehicle 100. Herein, the charging permission request message may include a vehicle movement path and charging method information. The charging permission information may include information related to the charging device 210 that may be used by the vehicle 100 in the moving path of the vehicle 100 and a certificate for using the charging device 210. Herein, the vehicle 100 may be the leader vehicle 100 forming a platooning vehicle group with one or more following vehicles 100.

When the vehicle 100 deviates from a charging area or a charging path, the billing processor 222 may be configured to receive metering information that is generated using a power supply amount or cost information per unit power for the vehicle 100 from the charging device 210. The billing processor 222 may be configured to charge the vehicle 100 based on the metering information. For example, when receiving the metering information generated by using the power supply amount or the cost information per unit power for each individual vehicle of the vehicles performing the platooning from the charging device 210, the billing processor 222 may be configured to charge for each individual vehicle.

Figure 5:
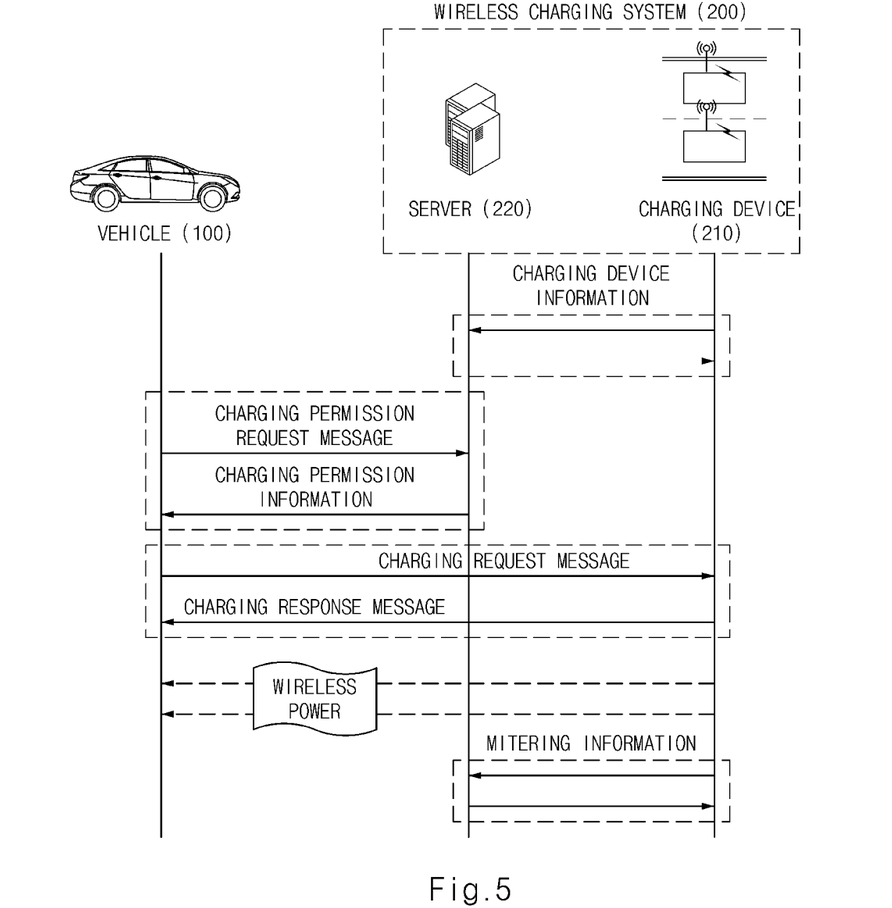
FIG. 5 illustrates a response procedure of a wireless charging system in response to a vehicle charging request according to an exemplary embodiment disclosed in the present document.

FIG. 5 illustrates a response procedure of a wireless charging system in response to a vehicle charging request according to an exemplary embodiment disclosed in the present document. Referring to FIG. 5, the wireless charging apparatus 210 and the server 220 of the wireless charging system 200 may be configured to periodically transmit and receive charging device information.

The vehicle 100 may be configured to transmit a charging permission request message to the server 210, and receive charging permission information including information related to the charging device 210 and a certificate for using the charging device from the server 210. The vehicle 100 may be configured to transmit a charging request message including permission information to the charging device 210, and receive a charging response message from the charging device 210.

The vehicle 100 may be configured to transmit a charging permission request message including vehicle movement path information to the server 220, and receive charging permission information from the server 210. In particular, the server 220 may be configured to transmit to the vehicle 100 charging permission information including information related to the charging device 210 that may be used by a vehicle in a vehicle movement path and a certificate for using the charging device 210.

Additionally, the vehicle 100 may be configured to receive charging permission information from the server 220, check charging device information included in the charging permission information, and transmit a charging request message to the charging device 210. The charging device 210 may be configured to check charging permission information of the charging request message received from the vehicle 100, transmit a charging response message to the vehicle 100, and wirelessly transmit power to the vehicle 100. Herein, the charging device 210 may be a specific zone for wirelessly transmitting power when the vehicle 100 is stopped or a road for wirelessly transmitting power while driving without stopping the vehicle 100.

When the vehicle 100 deviates from a charging area or a charging path, which is the charging device, the charging device 210 may be configured to generate metering information by using a power supply amount or cost information per unit power for the vehicle 100 to transmit it to the server 220. The server 220 may be configured to charge the vehicle 100 based on the metering information received from the charging device 210.

Figure 6:
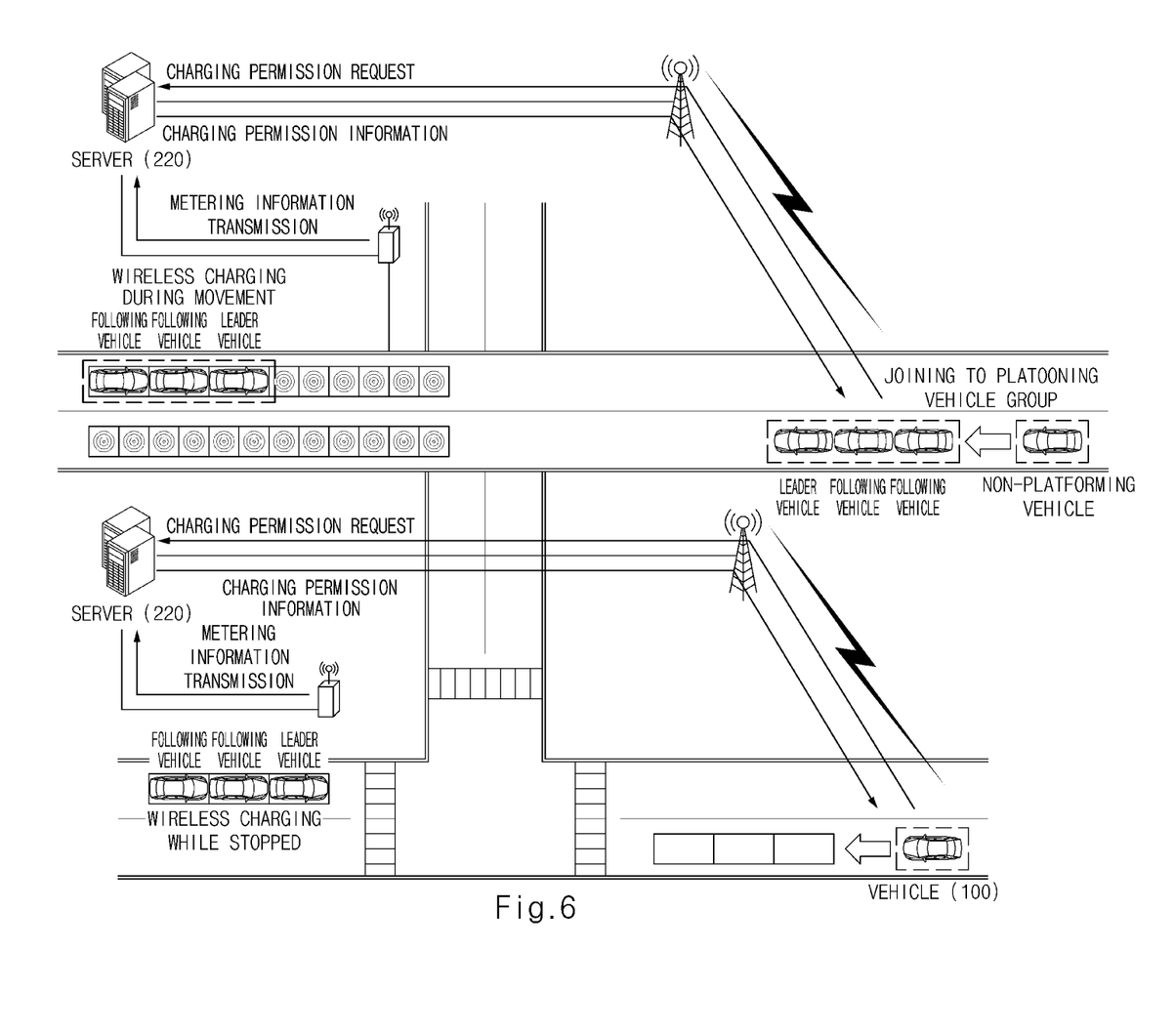
FIG. 6 illustrates a response procedure of a wireless charging system in response to a charging request of vehicles performing platooning according to an exemplary embodiment disclosed in the present document.

FIG. 6 illustrates a response procedure of a wireless charging system 200 in response to a charging request of vehicles performing platooning according to an exemplary embodiment disclosed in the present document. Referring to FIG. 6, a vehicle group performing platooning may include a leader vehicle and a follower vehicle of the leader vehicle.

For example, the non-platooning vehicle may be configured to receive a basic safety message (BSM) from a vehicle performing platooning. Herein, the BSM may include vehicle information including vehicle IDs of vehicles belonging to the platooning vehicle group. The non-platooning vehicle may be configured to transmit its vehicle ID and a vehicle charging method to the leader vehicle of the platooning vehicle group confirmed by using the BSM. When receiving information related to the vehicle ID and the charging method from the non-platooning vehicle not belonging to the platooning vehicle group, when there is at least one vehicle having a same charging method as that of the non-platooning vehicle among the vehicles belonging to the platooning vehicle group, the leader vehicle may join the non-platooning vehicle to the platooning vehicle group.

The leader vehicle 100 of the group performing platooning may be configured to transmit a charging permission request message including movement path information of the group performing platooning to the server 220. The server 220 may be configured to transmit to the leader vehicle 100 information related to the charging device 210 that may be used by vehicles performing platooning within a movement path of the vehicles performing platooning, and charging permission information including a certificate for using the charging device 210.

Additionally, the leader vehicle 100 may be configured to transmit a charging request message including the charging permission information to the charging device 210 included in the charging permission information received from the server 220. After checking the charging permission information included in the charging request message received from the leader vehicle 100, the charging device 210 may be configured to transmit a charging response message to the leader vehicle 100.

Herein, the charging device 210 may be a specific zone for wirelessly transmitting power when the vehicle 100 is stopped or a road for wirelessly transmitting power while driving without stopping the vehicle 100. The vehicles of the group performing platooning may be configured to wirelessly receive power from the charging device 210. In particular, the charging device 210 may prevent frequent contact on and off of the charging device by controlling the vehicles performing platooning as one vehicle without controlling wireless charging for each vehicle, thereby efficiently supplying power.

When the vehicles performing platooning deviate from a charging area or a charging path, the charging device 210 may be configured to generate metering information by using a power supply amount or cost information per unit power for the individual vehicle 100 of the vehicles performing platooning. The charging device 210 may be configured to transmit the metering information to the server 220. The server 220 may be configured to charge the individual vehicle 100 based on the metering information received from the charging device 210.

As described above, it may be possible to reduce a standby time for battery charging, thereby enabling flexible communication for vehicle mobility in accordance with the vehicle 100, the server 220, and the wireless charging system 200 according to an exemplary embodiment disclosed in the present document. In addition, as the leader vehicle of the platooning vehicle group transmits permission information including a certificate to the server 220 to perform an authentication procedure, other following vehicles in the platooning vehicle group may reduce an authentication delay time by not performing a separate authentication procedure.

In addition, as the leader vehicle requests charging including the movement path of the vehicles performing platooning to the server 220, the server 220 may be configured to recognize a path of the platooning vehicle to perform flexible communication in consideration of vehicle mobility. The vehicle 100 may be configured to transmit a charging request message to the charging device 210 and receive a charging response message from the server in advance in response thereto, and thus wireless charging efficiency may be improved by minimizing a communication procedure for the charging device 210 when entering the charging device 210.

Then, the wireless charging system 200 provides power when the vehicle 100 is driving or when the vehicle 100 is stopped, and then processes billing by generating metering information later after the vehicle 100 deviate from the charging device 210, and thus it is possible to respond to the high-speed movement of the vehicle 100. In addition, the wireless charging system 200 may enable wireless charging in various environments and situations by supporting the wireless charging in both stopped and driving states of the vehicle 100 and supporting the wireless charging in both a moving process of individual vehicles and a moving process of vehicles performing platooning, thereby improving traffic flow and traffic stability.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

DESCRIPTION OF SYMBOLS

100: vehicle
110: communication device
120: charge requester
130: power receiver
200: wireless charging system
210: charging apparatus
220: server
221: communication device
222: billing processor

What is claimed is:

1. A vehicle, comprising:
   a communication device configured to transmit a charging permission request message to a server and to receive charging permission information from the server;
   a charging requester configured to transmit a charging request message including the charging permission information to a charging device; and
   a power receiver configured to receive a charging response message from the charging device and to wirelessly receive power from the charging device;
   wherein the vehicle is a leader vehicle forming a platooning vehicle group with at least one following vehicle; and
   wherein the leader vehicle joins a non-platooning vehicle not belonging to the platooning vehicle group to the platooning vehicle group when there is at least one vehicle having a same charging method as that of the non-platooning vehicle among vehicles belonging to the platooning vehicle group.

2. The vehicle of claim 1, wherein the power receiver is configured to wirelessly receive power from the charging device while the vehicle is moving.

3. The vehicle of claim 1, wherein the charging device is installed on a road surface to wirelessly transmit power to a vehicle.

4. The vehicle of claim 1, wherein the leader vehicle is configured to receive information related to a vehicle ID and the charging method from the non-platooning vehicle.

5. The vehicle of claim 1, wherein the charging permission information includes information related to a charging device capable of being used by the vehicle and a certificate for using the charging device.

6. The vehicle of claim 1, wherein the charging request message includes vehicle information including a vehicle ID, a driving speed, and a vehicle position, and wireless charging permission information including a certificate for using the charging device.

7. A wireless charging system, comprising:
   a charging device installed on a road surface to wirelessly transmit power to a vehicle, and to generate metering information using a power supply amount or cost information per unit power for the vehicle when the vehicle deviates from a charging area or a charging path; and
   a server configured to collect and manage information related to the charging device, to receive a charging permission request message from the vehicle, to transmit charging permission information to the vehicle, to receive the metering information from the charging device, and to charge the vehicle based on the metering information; and
   the vehicle, wherein the vehicle is a leader vehicle forming a platooning vehicle group with at least one following vehicle; and
   wherein the leader vehicle joins a non-platooning vehicle not belonging to the platooning vehicle group to the platooning vehicle group when there is at least one vehicle having a same charging method as that of the non-platooning vehicle among vehicles belonging to the platooning vehicle group.

8. The wireless charging system of claim 7, wherein the charging device is configured to receive a charging request message including vehicle information including a vehicle ID, a driving speed, and a vehicle position, and charging permission information including a certificate for using the charging device from the vehicle, to check the charging permission information, and to transmit a charging response message to the vehicle to wirelessly transmit power to the vehicle.

* * * * *